Feb. 25, 1947.     J. L. LANDRUM     2,416,396
FLUID TRANSMISSION MECHANISM
Filed July 24, 1945      3 Sheets-Sheet 2
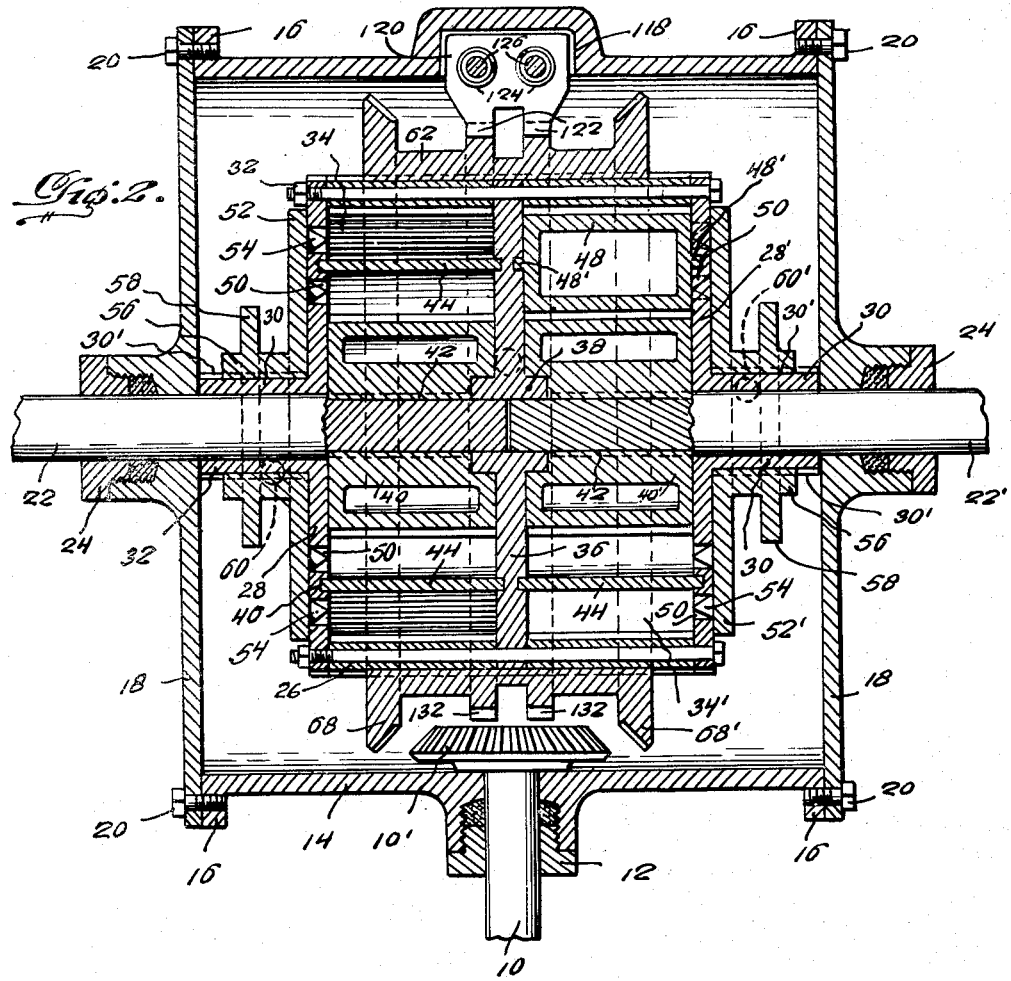
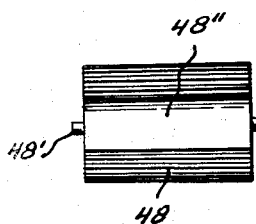
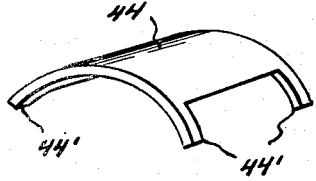
Inventor
Joel L. Landrum, Feb. 25, 1947.  J. L. LANDRUM  2,416,396
FLUID TRANSMISSION MECHANISM
Filed July 24, 1945  3 Sheets-Sheet 3
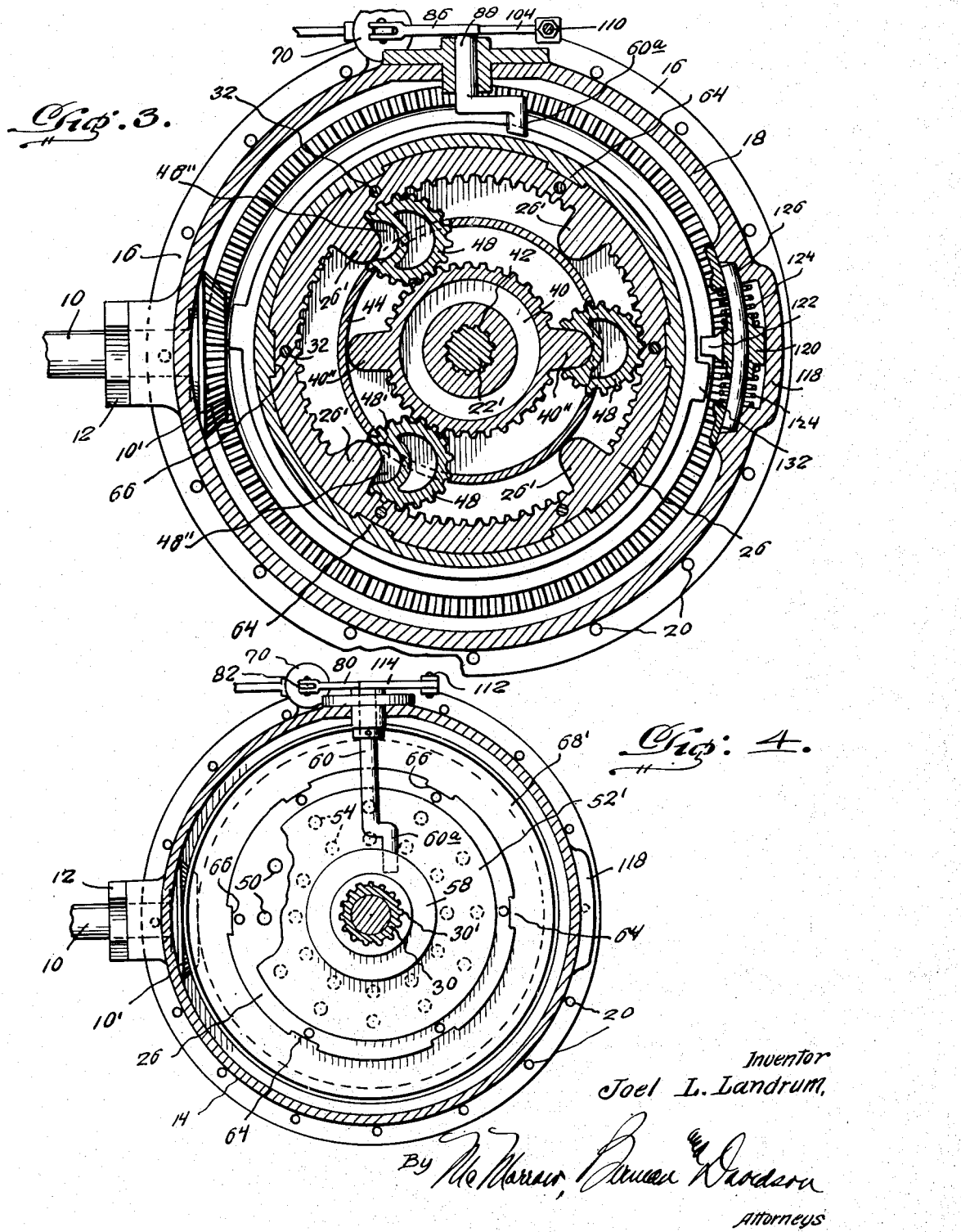
Inventor
Joel L. Landrum,
By
Attorneys Patented Feb. 25, 1947

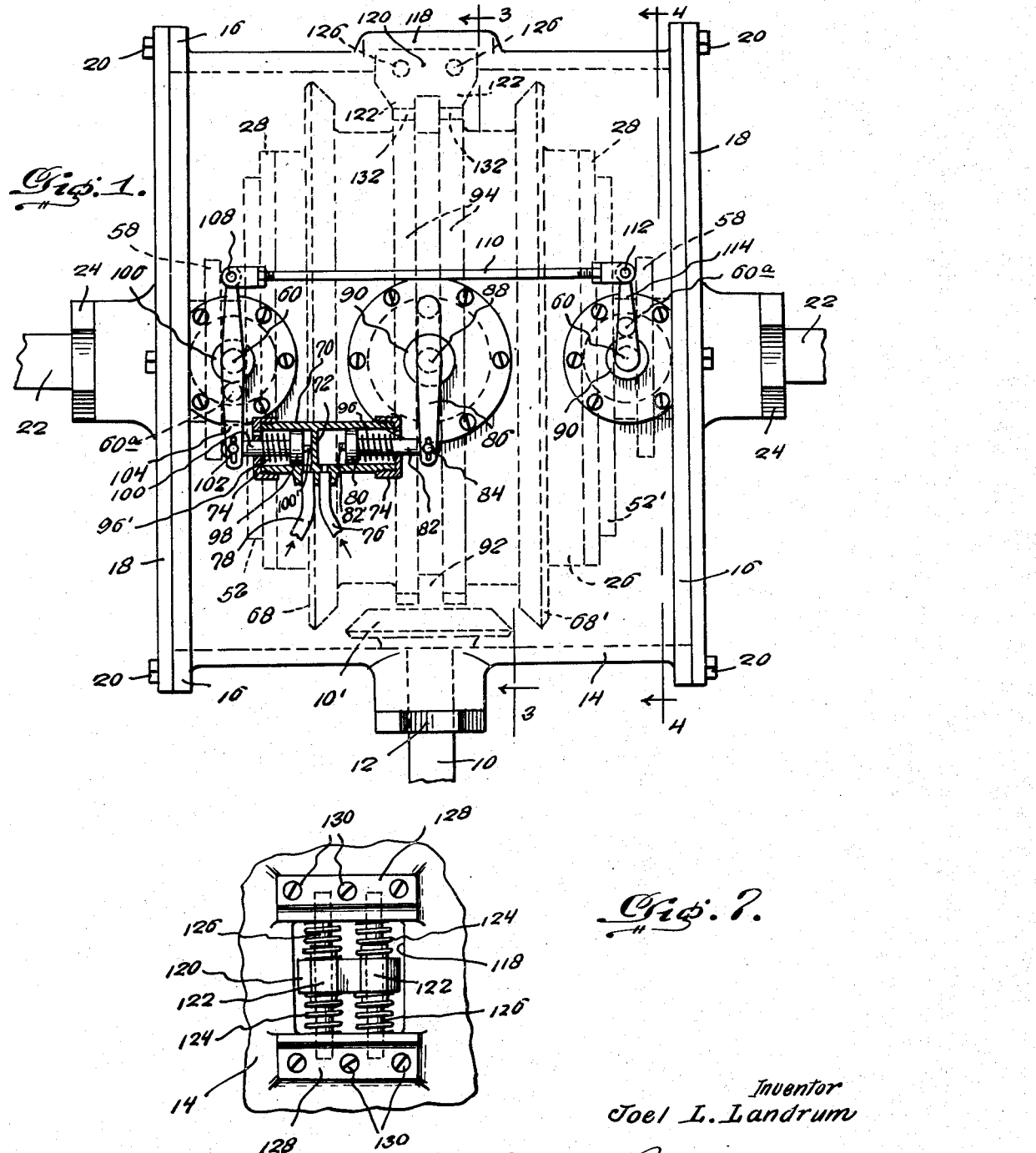

2,416,396

UNITED STATES PATENT OFFICE 2,416,396

FLUID TRANSMISSION MECHANISM

Joel L. Landrum, Clovis, N. Mex.

Application July 24, 1945, Serial No. 606,803

6 Claims (Cl. 74—389.5)

This invention appertains to a fluid transmission mechanism, especially designed for motor vehicles, and has for one of its several objects to provide a novel, practical, and efficient, single unit construction thereof, which will replace the clutch, power transmission, differential, and the brake system, now in general use as separate units for motor vehicle control and operation, and effectively perform each of the respective functions of those units, with the advantages of simplified control, less physical effort in control manipulation, reduced overall cost in motor vehicle manufacture and the expense of maintenance and repair of such units, elimination of the expense of the usual lubrication installations for the units and the servicing thereof, and smoother starting, stopping, and running, of the motor vehicle.

With these and other objects and advantages in view, the invention resides in the certain new and useful combination, construction, and arrangement of parts, as will be hereinafter more fully described, set forth in the appended claims, and illustrated in the accompanying drawings, in which:

Figure 1 is a top plan view, partly in section, of the transmission mechanism, in accordance with the invention;

Figure 2 is a horizontal section;

Figure 3 is a vertical section, taken through the line 3—3 on Figure 1, looking in the direction of the arrows;

Figure 4 is a sectional view similar to that of Figure 3, but taken through the line 4—4 on Figure 1, looking in the direction of the arrows; a portion of the valve control disc being broken away to show the fluid circulation ports opening through the adjacent end wall of the inner cylinder;

Figure 5 is a perspective view of one of the arcuate parts of the sectional cylindrical partition dividing the interior of the inner cylinder into concentric chambers;

Figure 6 is a side view of one of the rotary cylindrical abutments; and,

Figure 7 is a plan view of the brake element and its mounting.

Referring in detail to the drawings, wherein like characters of reference denote corresponding parts in the several views, the invention is essentially a rear axle assembly of a construction and design to be readily substituted for the present differential type thereof and to not only perform the ordinary functions of the same, but also to efficiently perform all of the functions of the usual clutch, power transmission (forward, reverse and speed changing), and brake mechanisms, now current in motor vehicle power plant assemblies.

As exemplified in the drawings, the improved power transmitting mechanism is comprised in a cylindrical housing 14, having its open ends formed with out-turned flanges 16 and closed by end plates 18, secured to the flanges by screws or the like 20. Opening centrally through the forward side of the housing 14, is a packing gland 12, through which the rear end of the drive shaft 10 extends into the housing, while both of the end plates 18 are likewise provided with centrally disposed packing glands 24 for the insertion therethrough of the left and right rear axle shafts 22 and 22', respectively.

Centered within the housing 14, is a hollow cylindrical body 26, having removable end plates 28, secured on its open ends by screws or the like 32; the end plates having outwardly extending hubs 30, to serve as bearings to support the body on the inwardly projecting end portions of the axle shafts 22, 22', as well as to space the body centrally between the end plates 18, of the housing 14. The interior of the body 26 is divided into two chambers 34, 34', of equal capacity, by a vertical partition 36, which has an oppositely bossed opening in its center to form a bearing 38 for the extreme inner ends of the axle shafts 22, 22'.

Mounted within the chambers 34, 34', are hollow, longitudinally toothed, rollers 40, 40', respectively, which are each splined, as at 42, to a corresponding shaft axle 22, 22', and have their inner ends recessed to seat over the adjacent ends of the bearing 38. Thus, the chambers 34, 34', are annular in form and concentric with respect to the side wall of the body 26, and each of the same are divided into inner and outer annular compartments by means of a series of arcuate partitions 44 (three in number, as shown in Figures 2 and 3), which have their curved end edges slidably engaged in annular grooves or channels 46, formed in the opposite faces of the vertical partition 36 and the inner faces of the end plates 28.

Positioned between the opposite side edges of the partitions 44, in each of the chambers 34, 34', are roller abutments or packings 48 (three in number, as shown), which are preferably in the form of hollow cylinders and provided with end trunnions 48', engaged in the grooves or channels 46 and between the ends of laterally extending portions 44', of the partitions 44 (Figure 5).

These roller abutments 48 have toothed peripheries in mesh with the teeth of the rollers 40, 40', and with like teeth formed in the inner face of the side wall of the body 26; the latter also being formed with a series of ribs 26' (three in number, as shown), equidistantly spaced about and extending lengthwise of the same, while two of such ribs 40" are formed lengthwise on each of the toothed rollers 40, 40', diametrically opposite one another. These ribs 26' and 40" are tapered slightly toward their free edges, with the free edges rounded to substantially semi-circular cross section. In operation, the axle shafts 22, 22', the cylindrical body 26, the toothed rollers 40, 40', and the roller abutments 48, are rotated cooperatively in relation to each other and, in so doing, the ribs 26' and 40" wipe the opposite faces of the partitions 44 and sequentially cooperate with and enter longitudinally extending grooves 48", formed in each of the roller abutments 48, for purposes which will presently be explained.

In adapting the mechanism just described to its intended uses, the housing 14 will be filled with a suitable fluid and this will be alternately admitted to and discharged from the several compartments of each of the chambers 34, 34', through ports 50 and 50', respectively, opening through the end plates 28; the admission and discharge movements of the fluid being controlled and regulated by means of valve discs 52 and 52', respectively, splined, as at 30', for sliding movements on the hubs 30, of the end plates 28. The inner faces of the valve discs 52, 52', are provided with conical valve elements 54, one for each of the ports 50, 50'; said valve elements cooperating with the ports after the manner of needle valves to control and regulate the reversed movements of the fluid therethrough. Each of the valve discs 52, 52', is outwardly hubbed, as at 56, and each hub is formed to provide an annular flange 58, to form an annular channel between the same and the opposed face of the disc to receive an actuating element 60.

A practical means for effecting the rotation of the parts as aforesaid, is comprised in a collar or ring 62, encircled about the cylindrical body 26 for rotation therewith; it having a series of driving lugs 64 on its inner face slidably engaged in grooves 66, formed lengthwise in the outer face of the body 26, the lugs engaging with said grooves when the collar or ring is telescopically fitted onto the body. The collar or ring 62 has its end edges out-turned and toothed to form bevel gears 68 and 68', adapted to be alternately moved into and out of engagement with a bevel pinion 10', keyed on the rear end of the drive shaft 10, within the housing 14, through controlled, directional, endwise movements of the collar or ring 62, relatively to the body 26 and the bevel pinion 10'; one of the bevel gears 68, 68', when meshed with the pinion 10', imparting a forward drive to the axle shafts 22, 22', and the other bevel gear, a reversed drive thereof.

To control the forward and reverse drive of the axle shafts 22, 22', which is effected through coordinated movements of the collar or ring 62 and the valve discs 52, 52', a pressure cylinder 70 is mounted on the top side of the housing 14, transversly thereof, and has its interior divided into two chambers by a centrally disposed partition 72 and its open ends closed by end caps 74, screw threaded thereon; the chambers, immediately adjacent the opposite sides of the partition 72, being separately connected, by conduits 76 and 78, to a proper, manually operated, control valve (not shown) in connection with a source of a suitable pressure supply, e. g., compressed air, and conveniently located in proximity to the driver's position on the motor vehicle, i. e., either mounted on the steering post, or on the instrument panel of the cowl, as desired.

Mounted for movement, for instance, in the right hand chamber of the cylinder 70, is a piston 80, having a rod 82 extending outwardly through the end cap and coupled, by a pin and slot connection 84, to one end of an arm 86 which is fixedly mounted, at a point intermediate its ends, to the upper end of a crank element 88, the latter being journalled in a bushing 90, opening through the top wall of the housing 14 and having its lower end engaged in an annular channel 92, formed between spaced flanges 94, integral with the collar or ring 62 and centered thereon with respect to the bevel gears 68, 68'. A coiled spring 96 is positioned on the piston rod 82, within the cylinder chamber and between the piston 80 and the end cap 74, and acts to urge the piston toward the partition 72, whenever the air pressure is relieved, or exhausted, from behind the piston. With the air partially relieved from behind the piston, it is held by the spring 96 at an intermediate point within the chamber and, at the same time, the collar or ring 62 is moved to centered position on the body 26, at which position, both bevel gears 68, 68', are unmeshed from the driving pinion 10'. When the air is completely exhausted from behind the piston 80, the spring 96 acts to force it farther toward the partition 72, i. e., to the left, and, with it, the collar or ring 62 to the right, placing the bevel gear 68 in mesh with the driving pinion 10', and thereby conditioning the mechanism for the forward drive of the axle shafts 22, 22'. Conversely, when full pressure is admitted to the cylinder chamber, the piston 80 is forced outward, i. e., to the right, beyond the intermediate point, placing the spring 96 under compression, and actuating the arm 86 and the crank element 88 to move the collar or ring 62 to the left to put the bevel gear 68' in mesh with the drive pinion 10', thus conditioning the mechanism for the reverse, or backward, drive of the axle shafts 22, 22'. A stop element 82' is formed on the inner face of the piston 80, in line with the rod 82, to abut against the partition 72, whenever the piston is disposed at its innermost position within the cylinder chamber and in order to provide a clearance therebetween for the effective admission of the air pressure behind the piston.

Mounted within the other, or left hand, chamber of the pressure cylinder 70, is a piston 98, having a rod 100 extending outwardly through the end cap 74 and coupled, by means of a pin and slot connection 102, to one end of an arm 104. The arm 104 is fixedly secured, intermediate its ends, to the upper end of the actuating element 60, for the valve disc 52; which element is preferably in the form of a crank having its upper shaft part journalled in a bushing 106, opening through the top side of the housing 14, and its lower shaft part engaged in the channel, formed on the hub 56 of the valve disc 52. The opposite end of the arm 104 is pivoted, as at 108, to one end of a connecting rod 110, extending to and pivotally connecting, as at 112, at its other end, the free end of an arm 114, carried at the upper end of the actuating element or crank 60, for the valve disc 52'. The upper shaft part of the element or crank 114 is journalled in a bushing 116, mounted in the top wall of the housing 14, and has its lower shaft part engaged in the channel formed on the hub 56', of the valve disc 52'. A coiled spring 96' is positioned on the piston rod 100, between the piston 98 and the end cap 74, to normally urge the piston toward the central partition within the pressure cylinder 70. A stop element 100' is provided on the inner face of the piston 98, in line with the piston rod 100, to abut against the partition 72, in order to provide a clearance therebetween for the effective admission of air pressure behind the piston, whenever the latter is disposed at its innermost position.

It is to be here noted that the cranks 60a, of the actuating elements 60, are offset in opposite directions, as shown in Figures 1 and 2, so as to engage the channels on the hubs 56, 56', in a manner that, in the directional movements of the piston 98, the valve discs 52, 52', will be simultaneously moved to open and close the ports 50, 50', in the end plates 28 of the cylindrical body 26. Also, that in the travel of the roller abutments 48, within each of the chambers 34, 34', of the cylindrical body 26, and between the side wall of the latter and the toothed rollers 40, 40', a substantial rolling contact is maintained between the opposed surfaces of these parts at all times. Again, that the gear ratio of the toothed areas of the side wall of the body 26, of the roller abutments 48, and of the rollers 40, 40', is such that the operation thereof is timed for the cooperative entrance of the ribs 40'', on the side wall of the body 26 and on the rollers 40, 40', respectively, into the grooves 48'', in the roller abutments 48, for the pocketing of the fluid within one or the other, or both, of the chambers 34, 34', depending upon the closing or partial closing, of the ports 50, 50', in accordance with the setting of the valve discs 52, 52', which is to be accomplished by directional movements of the piston 98.

In the operation of the mechanism as thus constructed and arranged, and with it set at its neutral position, i. e., the collar or ring 62 centered on the cylindrical body 26 to disconnect both of the bevel gears 68, 68', from the drive pinion 10', and the valve discs 52, 52', closed on the ports 50, 50', as shown in Figures 1 and 2, to start up the motor vehicle for its reverse direction of travel, by introducing additional compressed air to the right hand chamber of the pressure cylinder 70, the piston 80 will be forced to the right, placing the spring 96 further under compression and moving the collar or ring 62 to the left, when the bevel gear 68' will mesh with the drive pinion 10' and the power from the drive shaft 10 will be transmitted to the cylindrical body 26, at the driving lugs 64, carried by the collar or ring 62, engaged in the grooves 66, in the outer face of the side wall of the body. Thus, with the ports 50, 50', closed, or partially so, by the valve discs 52, 52', a portion of the fluid will be confined within the chambers 34, 34', and trapped within the compartments, or spaces, between the ribs 26' and 40'', of the cylindrical body 26 and the rollers 40, 40', respectively, a substantial clutching effect is produced between the body 26 and the axle shafts 22, 22', and the latter are caused to rotate in the same direction as the body 26. To change the direction of motor vehicle travel to forward, the compressed air will be exhausted from the right hand chamber of the pressure cylinder 70, when the spring 96 will expand and force the piston 80 to the left and with it the collar or ring 62 will be moved to the right, causing the bevel gear 68 to mesh with the drive pinion 10'. Here, the direction of rotation of the cylindrical body 26 will be reversed as will that of the axle shafts 22, 22', from that in the first instance.

The speed in travel of the motor vehicle is to be varied at the will of the driver by his or her manipulation of the control of the air admitted to the left hand chamber of the pressure cylinder 70, causing movements of the piston 98 to actuate the valve discs 52, 52', and thereby vary the degree of opening and closing of the ports 50, 50'. Thus, with the ports 50, 50' fully closed, maximum power of the drive shaft 10 is delivered to the axle shafts 22, 22', and the motor vehicle will be driven at maximum speed and power, as will be well understood; whereas, with the ports opened in varying degrees, the motor would increase in speed in corresponding degrees, multiplying the amount of torque transmitted to the axle shafts 22 and 22', while the speed of the vehicle would be reduced accordingly. Air pressure admitted to the left hand chamber of the pressure cylinder 70, as before stated, forces the piston 98 to the left, placing the spring 96' under compression, so that, upon the exhausting of the air from the chamber behind the piston, the latter expands and forces the piston back to its normal position.

Included with the aforegoing mechanism is braking means and, as best shown in Figures 2 and 7, the circumferential wall of the housing 14 is formed with an offset 118, at a point thereon opposite the packing gland 12, to provide a recess at its inner side to receive a brake element 120, which is loosely mounted on a pair of parallel rods 126 and is centered on the same by pairs of opposed spring 124; the ends of the rods being supported in brackets 128, secured to opposite walls of the recess by screws or the like 130. The brake element 120 is formed to provide a pair of spaced lugs 122, which engage lugs 132, formed in the peripheries of the flanges 94, on the outer surface of the collar or ring 62, whenever the latter is centered on the cylindrical body 26. Thus, left and right hand movements of the collar or ring 62 to place one or the other of the bevel gears 68, 68' in mesh with the driving pinion 10', automatically disengages the lugs 132, in the flanges 94 on the collar or ring, from the lugs 122, to free the cylindrical body 26, and, consequently, the axle shafts 22, 22' for reversed directional rotation, while the lugs are likewise re-engaged when the collar or ring is returned to its central position on the body.

Without further description, it is thought to be obvious that instead of using compressed air for operating the pistons 80 and 98, the same may be operated with other suitable fluid pressure and controlled by a conventional valve, or valves, of any approved type, connected to the pressure supply lines or conduits 76 and 78. Also, that the fluid employed in the housing 14 and the cylindrical body 26 is preferably one of a non-compressible type and having an appreciable viscosity, such as a good grade of oil, which will also function as a lubricant for the movable parts of the entire mechanism. While a practical and efficient embodiment of the mechanism has been specifically described and illustrated herein, it is to be understood that it is subject to such modification that may be found to be within the scope of the appended claims and this may be resorted to without other limitations.

What I claim is:

1. A fluid power transmission adapted to be substituted for the usual differential of a motor vehicle, comprising a stationary hollow housing adapted to be filled with a non-compressible viscous fluid, a hollow cylindrical body mounted within said housing and supported for free rotation on the rear left and right hand axle shafts of the motor vehicle, said body having ports for the circulation of the fluid between the interiors of the same and said housing, interacting means carried by and within said body and by each of said axle shafts for the entrapment of a portion of the fluid therebetween upon the closing, or partial closing, of said ports, the drive shaft of the motor vehicle being operatively connected with the vehicle motor and projecting into said housing, a driving pinion on said drive shaft within said housing, gears in driving connection with said body, means under the control of the driver of the motor vehicle for selectively shifting said gears into and out of mesh with said driving pinion to cause a forward and a reverse rotation of said body, and other means also under the control of the driver to open and close said ports to vary the speed of rotation of the axle shafts relatively to that of the body.

2. The invention as in claim 1, with said housing cylindrical in form and having a packing gland opening centrally through the front side of its circumferential wall, and other packing glands opening centrally through the end walls of the housing for the insertion and withdrawal of said axle shafts therethrough.

3. A fluid power transmission adapted to be substituted for the usual differential of a motor vehicle, comprising a stationary hollow housing adapted to be filled with a non-compressible viscous fluid, a hollow cylindrical body mounted within said housing and supported for free rotation on the rear left and right hand axle shafts of the motor vehicle, said body having ports for the circulation of the fluid between the interiors of the same and said housing, interacting means carried by and within said body and by each of said axle shafts for the entrapment of a portion of the fluid therebetween upon the closing, or partial closing, of said ports, the drive shaft of the motor vehicle being operatively connected with the vehicle motor and projecting into said housing, a bevel pinion on said drive shaft within said housing, bevel gears in driving connection with said body, means under the control of the driver of the motor vehicle for selectively shifting said gears into and out of mesh with said driving pinion to cause a forward and a reverse rotation of said body, and other means also under the control of the driver to open and close said ports to vary the speed of rotation of the axle shafts relatively to that of the body.

4. A fluid power transmission adapted to be substituted for the usual differential of a motor vehicle, comprising a stationary hollow housing adapted to be filled with a non-compressible viscous fluid, a hollow cylindrical body mounted within said housing and supported for free rotation on the rear left and right hand axle shafts of the motor vehicle, a collar mounted on said body in driving connection therewith, and spaced bevel gears carried by said collar, said collar having endwise movements relatively to said body to alternately move said bevel gears, said body having ports for the circulation of the fluid between the interiors of the same and said housing, interacting means carried by and within said body and by each of said axle shafts for the entrapment of a portion of the fluid therebetween upon the closing, or partial closing, of said ports, the drive shaft of the motor vehicle being operatively connected with the vehicle motor and projecting into said housing, a bevel pinion on said drive shaft within said housing, means under the control of the driver of the motor vehicle for selectively shifting said gears into and out of mesh with said bevel pinion to cause a forward and a reverse rotation of said body, and other means also under the control of the driver to open and close said ports to vary the speed of rotation of the axle shafts relatively to that of the body.

5. A fluid power transmission adapted to be substituted for the usual differential of a motor vehicle, comprising a stationary hollow housing adapted to be filled with a noncompressible viscous fluid, a hollow cylindrical body mounted within said housing and supported for free rotation on the rear left and right hand axle shafts of the motor vehicle, said body having ports for the circulation of the fluid between the interiors of the same and said housing, said cylindrical body having a central partition to divide its interior into two chambers of substantially equal capacity and having said ports opening through each of its end walls to establish communication between each of the chambers and the interior of said housing, a valve member mounted at each end of said body and for adjustment relative thereto to open and close said ports, interacting means carried by and within said body and by each of said axle shafts for the entrapment of a portion of the fluid therebetween upon the closing, or partial closing, of said ports, the drive shaft of the motor vehicle being operatively connected with the vehicle motor and projecting into said housing, a driving pinion on said drive shaft within said housing, gears in driving connection with said body, means under the control of the driver of the motor vehicle for selectively shifting said gears into and out of mesh with said driving pinion to cause a forward and a reverse rotation of said body, and other means also under the control of the driver to open and close said ports to vary the speed of rotation of the axle shafts relatively to that of the body.

6. A fluid power transmission adapted to be substituted for the usual differential of a motor vehicle, comprising a stationary hollow housing adapted to be filled with a noncompressible viscous fluid, a hollow cylindrical body mounted within said housing and supported for free rotation on the rear left and right hand axle shafts of the motor vehicle, said body having ports for the circulation of the fluid between the interiors of the same and said housing, said cylindrical body having a central partition to divide its interior into two chambers and having said ports opening through each of its end walls to establish communication between each of said chambers and the interior of said housing, adjustable valve means for opening and closing said ports, a toothed roller within each of said chambers and splined to a corresponding axle shaft, gear teeth formed on the inner surface of the circumferential side wall of said body, a sectional partition floatingly supported within each of said chambers and concentrically with respect to the roller and the side wall of the body, toothed roller abutments mounted between the sections of said partition and in meshing relation with said roller and the toothed side wall of the body, spaced ribs carried on the toothed side wall of said body, other ribs spaced at opposite points on said roller, said ribs having wiping contact with the opposite surfaces of said partition, said roller abutments each having a groove to be engaged by said ribs, and said ports being arranged to open through the end walls of said body at each side of said partition, the drive shaft of the motor vehicle being operatively connected with the vehicle motor and projecting into said housing, a driving pinion on said drive shaft within said housing, gears in driving connection with said body, means under the control of the driver of the motor vehicle for selectively shifting said gears into and out of mesh with said driving pinion to cause a forward and a reverse rotation of said body, and other means also under control of the driver to open and close said ports to vary the speed of rotation of the axle shafts relatively to that of the body.

JOEL L. LANDRUM.

REFERENCES CITED

The following references are of record in the file of this patent:

UNITED STATES PATENTS

| Number | Name | Date |
|---|---|---|
| 1,420,798 | Weston | June 27, 1922 |
| 1,429,100 | Ross | Sept. 12, 1922 |
| 1,858,647 | Von Hilvety | May 17, 1932 |